(12) United States Patent
Yanagida et al.

(10) Patent No.: US 11,031,743 B2
(45) Date of Patent: Jun. 8, 2021

(54) ELECTRIC CONNECTION MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Osamu Nakayama, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/645,970

(22) PCT Filed: Sep. 7, 2018

(86) PCT No.: PCT/JP2018/033136
§ 371 (c)(1),
(2) Date: Mar. 10, 2020

(87) PCT Pub. No.: WO2019/058992
PCT Pub. Date: Mar. 28, 2019

(65) Prior Publication Data
US 2020/0280153 A1    Sep. 3, 2020

(30) Foreign Application Priority Data
Sep. 22, 2017   (JP) .............................. JP2017-182219

(51) Int. Cl.
*H01R 25/00* (2006.01)
*H01R 25/16* (2006.01)

(52) U.S. Cl.
CPC ................................ *H01R 25/161* (2013.01)

(58) Field of Classification Search
CPC .... H01R 25/161; H01R 25/14; H01R 13/453; H01R 25/162; H01R 25/145; H01R 25/164
(Continued)

(56) References Cited

U.S. PATENT DOCUMENTS

| 1,988,627 A | * | 1/1935 | MacLellan Lewis .. H01R 25/14 |
| | | | 439/113 |
| 2,495,280 A | * | 1/1950 | O'Brien ............... H01R 25/161 |
| | | | 174/116 |

(Continued)

FOREIGN PATENT DOCUMENTS

| JP | 2005-346930 | 12/2005 |
| JP | 2012-216328 | 11/2012 |

(Continued)

OTHER PUBLICATIONS

Official Communication issued in International Bureau of WIPO Patent Application No. PCT/JP2018/033136, dated Nov. 20, 2018.

*Primary Examiner* — Abdullah A Riyami
*Assistant Examiner* — Vladimir Imas
(74) *Attorney, Agent, or Firm* — Greenblum & Bernstein, P.L.C.

(57) ABSTRACT

An electric connection member includes a busbar, a protector portion, and a cover. The busbar includes a live portion that is located between terminal connecting portions. The protector portion has a busbar mounting surface on which the live portion of the busbar is mounted, and insulates and protects the live portion. The cover is coupled to the protector portion and covers a surface of the live portion. The cover has an abutment portion that abuts against the surface of the live portion. The abutment portion includes a pressure contact surface that is in direct or indirect contact (Continued)

with the surface of the live portion while being pressed against the surface of the live portion in a state in which the cover is coupled to the protector portion.

12 Claims, 15 Drawing Sheets

(58) Field of Classification Search
USPC .......................................................... 439/113
See application file for complete search history.

(56) References Cited

U.S. PATENT DOCUMENTS

| | | | | | |
|---|---|---|---|---|---|
| 2,515,255 | A | * | 7/1950 | O'Brien | H01R 25/161 174/101 |
| 2,680,233 | A | * | 6/1954 | McFarlin | H01R 25/14 439/120 |
| 2,968,782 | A | * | 1/1961 | Herrmann | H01R 25/161 439/117 |
| 3,871,729 | A | * | 3/1975 | Attema | H01R 25/142 439/116 |
| 3,956,576 | A | * | 5/1976 | Jensen | H01M 2/32 174/138 F |
| 4,018,497 | A | * | 4/1977 | Bulanchuk | H02G 5/04 439/115 |
| 4,156,795 | A | * | 5/1979 | Lacan | H01R 25/161 174/101 |
| 4,376,561 | A | * | 3/1983 | Vanden Hoek | E04B 2/7427 439/210 |
| 4,488,033 | A | * | 12/1984 | Trachtenberg | H05B 3/84 156/574 |
| 4,945,188 | A | * | 7/1990 | Jackson | H02G 5/002 174/16.2 |
| 4,957,447 | A | * | 9/1990 | Hibbert | H01R 25/161 439/113 |
| 5,525,068 | A | * | 6/1996 | Graham | H01R 13/4534 439/114 |
| 5,576,516 | A | * | 11/1996 | Kameyama | H01R 11/284 174/138 F |
| 5,619,014 | A | * | 4/1997 | Faulkner | H02G 5/007 174/129 B |
| 5,785,542 | A | * | 7/1998 | Johnson | H01R 25/162 439/210 |
| 5,804,770 | A | * | 9/1998 | Tanaka | H01M 2/206 174/138 F |
| 5,951,340 | A | * | 9/1999 | Mueller | H01R 25/161 439/891 |
| 5,977,485 | A | * | 11/1999 | Yoshimura | H01R 11/288 174/138 F |
| 6,890,221 | B2 | * | 5/2005 | Wagner | H01R 12/7088 439/65 |
| 7,544,071 | B2 | * | 6/2009 | Jong | H01R 13/453 439/113 |
| 7,922,508 | B2 | * | 4/2011 | Kondas | H01R 25/161 439/211 |
| 9,391,413 | B2 | * | 7/2016 | Blasbalg | H02B 1/06 |
| 9,450,225 | B2 | * | 9/2016 | Nakayama | H01M 2/1077 |
| 9,508,464 | B2 | * | 11/2016 | Nakayama | H01B 17/56 |
| 9,831,736 | B2 | * | 11/2017 | Houzumi | H02K 3/50 |
| 9,905,831 | B2 | * | 2/2018 | Nakayama | H01M 2/206 |
| 10,050,395 | B2 | * | 8/2018 | Ngo | H01R 43/28 |
| 10,074,845 | B2 | * | 9/2018 | Watanabe | H01M 10/48 |
| 10,115,934 | B2 | * | 10/2018 | Seong | H01M 2/0202 |
| 10,215,207 | B2 | * | 2/2019 | Sone | F16H 61/00 |
| 10,231,348 | B2 | * | 3/2019 | Morimoto | B60L 53/16 |
| 10,297,962 | B1 | * | 5/2019 | Costello | H02B 1/205 |
| 10,622,605 | B2 | * | 4/2020 | Nakayama | H01M 2/206 |
| 10,680,225 | B2 | * | 6/2020 | Nakayama | H01M 2/1077 |
| 2003/0054239 | A1 | * | 3/2003 | Watanabe | H01M 10/0468 429/152 |
| 2004/0035853 | A1 | * | 2/2004 | Pais | E01C 11/265 219/548 |
| 2011/0027634 | A1 | * | 2/2011 | Kishimoto | H01M 10/425 429/90 |
| 2011/0104556 | A1 | * | 5/2011 | Kim | H01M 2/206 429/160 |
| 2012/0264317 | A1 | | 10/2012 | Balcerak et al. | |
| 2014/0023906 | A1 | * | 1/2014 | Hashimoto | H01M 2/1094 429/120 |
| 2014/0065468 | A1 | * | 3/2014 | Nakayama | H01M 2/206 429/160 |
| 2014/0158396 | A1 | | 6/2014 | Nakayama | |
| 2016/0197330 | A1 | * | 7/2016 | Takase | B60R 16/033 429/92 |
| 2017/0288199 | A1 | * | 10/2017 | Nakayama | H01M 2/206 |
| 2020/0169069 | A1 | * | 5/2020 | Hiramitsu | H01M 2/206 |

FOREIGN PATENT DOCUMENTS

| | | |
|---|---|---|
| JP | 2013-037988 | 2/2013 |
| JP | 2013-062103 | 4/2013 |
| JP | 2016-119184 | 6/2016 |

* cited by examiner

ELECTRIC CONNECTION MEMBER

TECHNICAL FIELD

The technology disclosed in the present specification relates to an electric connection member, and particularly relates to a heat dissipation technology for an electric connection member that includes a busbar and a cover insulating and covering the busbar.

BACKGROUND ART

Conventionally, an electric connection member disclosed in Patent Document 1, for example, is known as the above-described electric connection member. In Patent Document 1, an intermediate insulating member that covers the periphery of an intermediate portion of a busbar is disclosed as an insulating cover that covers a busbar.

CITATION LIST

Patent Documents

Patent Document 1: JP 2013-62103A

SUMMARY OF INVENTION

Technical Problem

However, in Patent Document 1 above, as shown in FIGS. 4(A) and 4(B) thereof, a clearance can be seen between the busbar and the intermediate insulating member. If a clearance such as this one is present, when a high current flows through the electric connection member as in the case where the electric connection member is used to connect a power supply of an electric automobile, there is a risk that the clearance will act as a thermal barrier when heat is generated by the busbar, and thus reduce the heat dissipation of the busbar.

To address this issue, the technology disclosed in the present specification provides an electric connection member with which heat dissipation of heat generated by a busbar can be improved.

Solution to Problem

An electric connection member disclosed in the present specification is an electric connection member for electrically connecting terminals to each other, the electric connection member including a busbar including a plurality of terminal connecting portions and a live portion located between the terminal connecting portions, a protector portion that has a busbar mounting surface on which the live portion of the busbar is mounted, and insulates and protects the live portion, and a cover that is coupled to the protector portion and covers a surface of the live portion, wherein the cover has an abutment portion that abuts against the surface of the live portion, and the abutment portion includes a pressure contact surface that is in direct or indirect contact with the surface of the live portion while being pressed against the surface of the live portion in a state in which the cover is coupled to the protector portion.

With this configuration, the abutment portion of the cover includes the pressure contact surface, which is in direct or indirect contact with the surface of the live portion of the busbar while being pressed against the surface of the live portion in a state in which the cover is coupled to the protector portion. Therefore, the busbar and the cover are in close contact with each other, enabling the heat generated by the busbar to be reliably transferred to the cover. Thus, heat dissipation of heat generated by the busbar can be improved.

In the above-described electric connection member, the pressure contact surface may be in direct contact with the surface of the live portion while being pressed against the surface of the live portion.

With this configuration, the pressure contact surface is in direct contact with the surface of the live portion, and therefore, an electric connection member that can ensure reliable dissipation of heat generated by a busbar can be achieved with a simple structure.

Moreover, in the above-described electric connection member, a thickness of the busbar may be larger than a separation distance between the pressure contact surface of the cover and the busbar mounting surface of the protector portion in a state in which the cover is coupled to the protector portion without the busbar.

With this configuration, when coupling the cover to the protector portion, it is possible to automatically apply a pressure from the pressure contact surface to the surface of the live portion of the busbar because of the distance conditions. Therefore, the configuration in which the pressure contact surface is in direct contact with the surface of the live portion while being pressed against the surface of the live portion can be achieved with a simple structure.

Moreover, in the above-described electric connection member, a heat conductive sheet may be provided between the pressure contact surface and the surface of the live portion, and the pressure contact surface may be in indirect contact with the surface of the live portion while being pressed against the surface of the live portion, via the heat conductive sheet.

With this configuration, the efficiency of heat conduction from the busbar to the cover can be improved by the heat conductive sheet.

Moreover, in the above-described electric connection member, a sum value obtained by adding a thickness of the heat conductive sheet to a thickness of the busbar may be larger than a separation distance between the contact surface of the cover and the busbar mounting surface of the protector portion in a state in which the cover is coupled to the protector portion without the busbar.

With this configuration, when coupling the cover to the protector portion, it is possible to automatically apply a pressure from the pressure contact surface to the surface of the live portion of the busbar because of the distance conditions. Therefore, in an embodiment in which a heat conductive sheet is provided, the configuration in which the pressure contact surface is in indirect contact with the surface of the live portion while being pressed against the surface of the live portion can be achieved with a simple structure.

Moreover, in the above-described electric connection member, the cover may have a coupling portion for coupling to the protector portion in at least one end portion of the cover in a width direction, the protector portion may have a coupling receiving portion for receiving the coupling portion in at least one end portion of the protector portion in the width direction, and the cover may have a flexible portion between the abutment portion and the coupling portion.

With this configuration, during the coupling of the coupling portion of the cover to the coupling receiving portion of the protector portion, the flexible portion can change the relative positional relationship of the coupling portion with the coupling receiving portion. Therefore, the efficiency of the coupling operation can be improved.

Moreover, in the above-described electric connection member, the flexible portion may include a curved portion that increases a creepage distance between the pressure contact surface and the coupling receiving portion in a state in which the coupling portion is coupled to the coupling receiving portion.

With this configuration, the electrical resistance between the busbar and the coupling receiving portion can be increased by the curved portion increasing the creepage distance. Therefore, the safety of the electric connection member in the case where condensation or the like occurs on the electric connection member can be improved.

Moreover, in the above-described electric connection member, at least one of the protector portion and the cover may have a heat dissipating fin.

With this configuration, heat dissipation from the cover can be improved by the heat dissipating fin.

Moreover, in the above-described electric connection member, a heat conductive sheet may be provided between the protector portion and the live portion.

With this configuration, the efficiency of heat conduction from the busbar to the protector portion can be improved by the heat conductive sheet.

Moreover, in the above-described electric connection member, the cover and the protector portion may be united by a hinge portion.

With this configuration, since the cover and the protector portion are united, the operation for producing an electric connection member can be simplified.

Advantageous Effects of Invention

According to the electric connection member disclosed in the present specification, it is possible to improve heat dissipation of heat generated by a busbar.

DESCRIPTION OF EMBODIMENTS

Embodiment 1

Embodiment 1 will be described with reference to FIGS. 1 to 9. An electric connection member 10 according to Embodiment 1 is used to electrically connect a plurality of terminals (not shown) to each other. For example, as will be described later, the electric connection member 10 is applied to a battery pack that is installed in a vehicle (not shown), such as an electric automobile or a hybrid car, and is used as a driving source of this vehicle.

1. Configuration of Electric Connection Member

Figure 1:
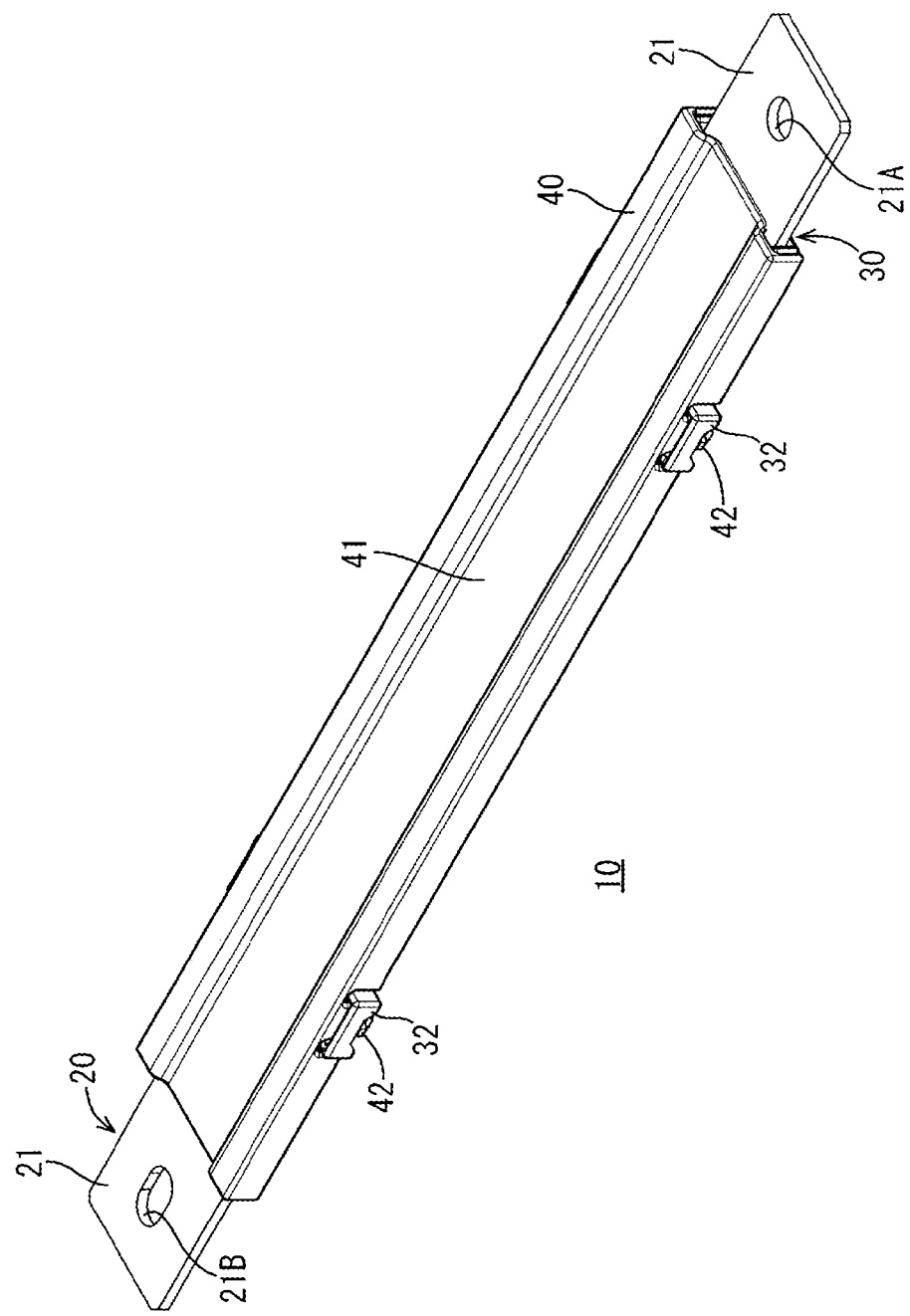
FIG. 1 is a perspective view showing an electric connection member according to Embodiment 1.

As shown in FIG. 1, the electric connection member 10 includes a busbar 20, a protector portion 30, and a cover 40.

Figure 6:
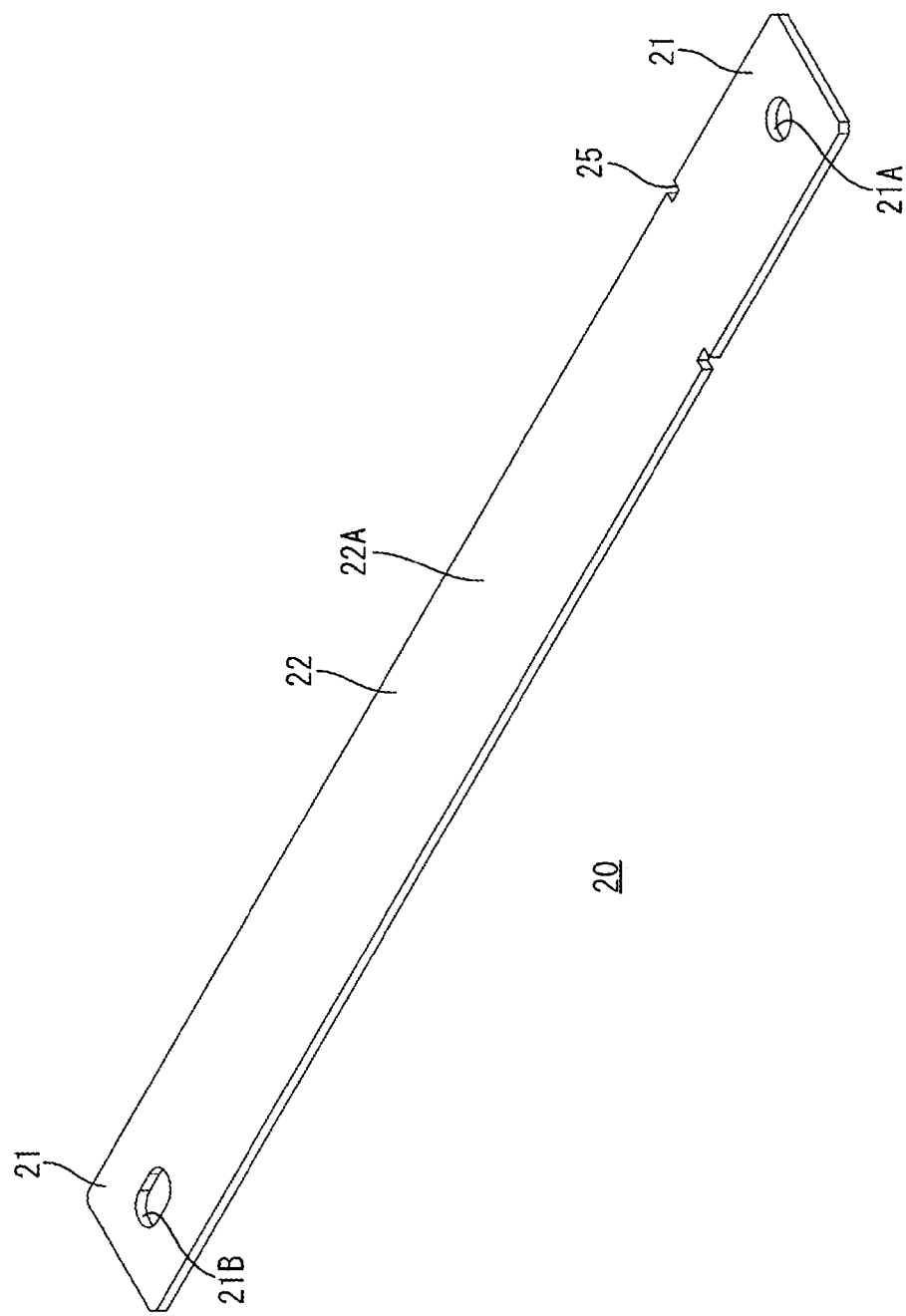
FIG. 6 is a perspective view showing the busbar.

As shown in FIG. 6, the busbar 20 includes terminal connecting portions 21 and a live portion 22 located between the terminal connecting portions. Through holes (21A and 21B) for coupling the busbar 20 to terminals are formed in the terminal connecting portions 21. Moreover, two notch portions 25 for engaging the busbar 20 with engagement projections 35 of the protector portion 30 are formed in the busbar 20.

Note that the shape of the busbar 20 in a plan view is not limited to an elongated rectangular shape such as that shown in FIG. 6. For example, the busbar 20 may have a shape that is bent into an L-shape in a plan view or a shape in which only the terminal connecting portions 21 are bent in a plan view. Furthermore, the busbar 20 may have a shape in which the terminal connecting portion 21 at one end or at each end is bifurcated in a plan view. That is to say, the busbar 20 may connect three or more terminals to each other. Moreover, the shape of the busbar 20 in a plan view is not limited to the above-described shapes, and the point is that it is sufficient that the busbar 20 has a shape that makes it possible to connect a plurality of terminals to each other.

Here, the thickness T1 (see FIG. 3) of the busbar 20 is larger than a separation distance K1 (see FIG. 4) between a pressure contact surface 41A of the cover 40 and a busbar mounting surface 31 of the protector portion 30, which will be described later, in a state in which the cover 40 is coupled to the protector portion 30 without the busbar 20. Note that the present invention is not limited to this configuration, and the thickness T1 of the busbar 20 need not be larger than the separation distance K1.

Figure 7:
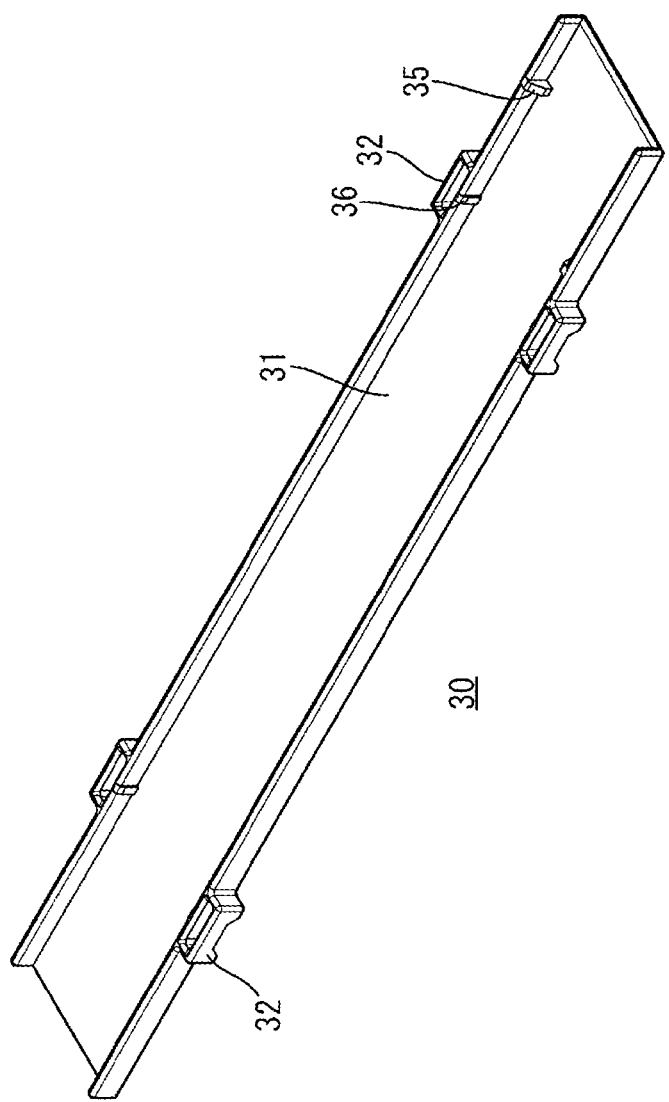
FIG. 7 is a perspective view showing a protector portion.

The protector portion 30 is made of a synthetic resin. As shown in FIG. 7, the protector portion 30 has the busbar mounting surface 31 on which the live portion 22 of the busbar is to be mounted, and insulates and protects the live portion 22. Moreover, the protector portion 30 has lock receiving portions (an example of a "coupling receiving portion") 32 that receive lock portions 42 of the cover 40, which will be described later, at two locations in the two end portions of the protector portion 30 in a width direction (direction of arrow Y in FIG. 2). Note that the present invention is not limited to this configuration, and it is sufficient that the protector portion 30 has a lock receiving portion 32 that receives a lock portion 42 of the cover 40 in at least one end portion of the protector portion 30 in the width direction thereof. Moreover, engagement projections 35 and projections 36 for restricting the movement of the busbar 20 are formed in the protector portion 30. The engagement projections 35 restrict the movement of the busbar 20 in a longitudinal direction (direction of arrow X in FIG. 2), and the projections 36 restrict the movement of the busbar 20 in the width direction (direction of arrow Y in FIG. 2).

Figure 3:
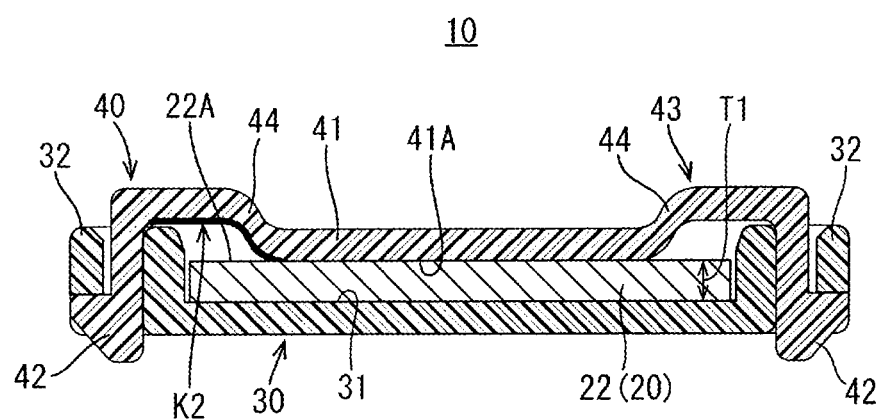
FIG. 3 is a cross-sectional view of the electric connection member when viewed from a direction indicated by arrows A in FIG. 2.
Figure 4:
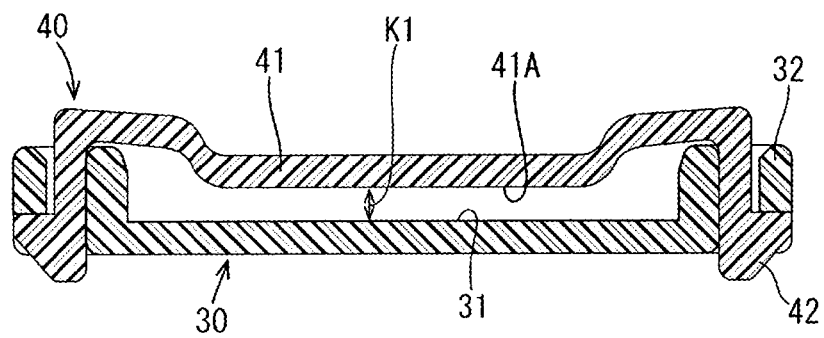
FIG. 4 is a cross-sectional view showing a state in which a busbar in FIG. 3 is removed.
Figure 5:
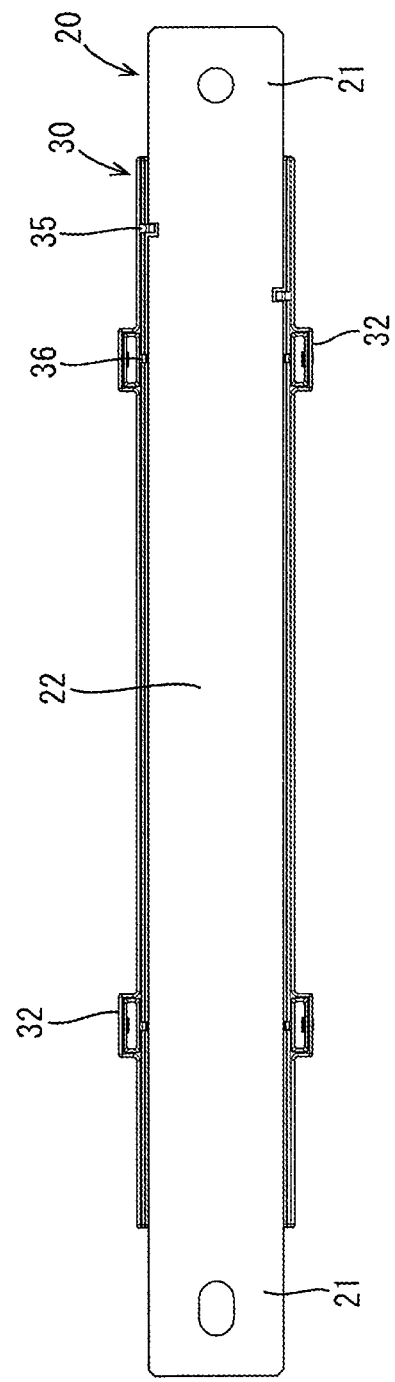
FIG. 5 is a plan view showing the electric connection member in a state in which a cover is removed.
Figure 8:
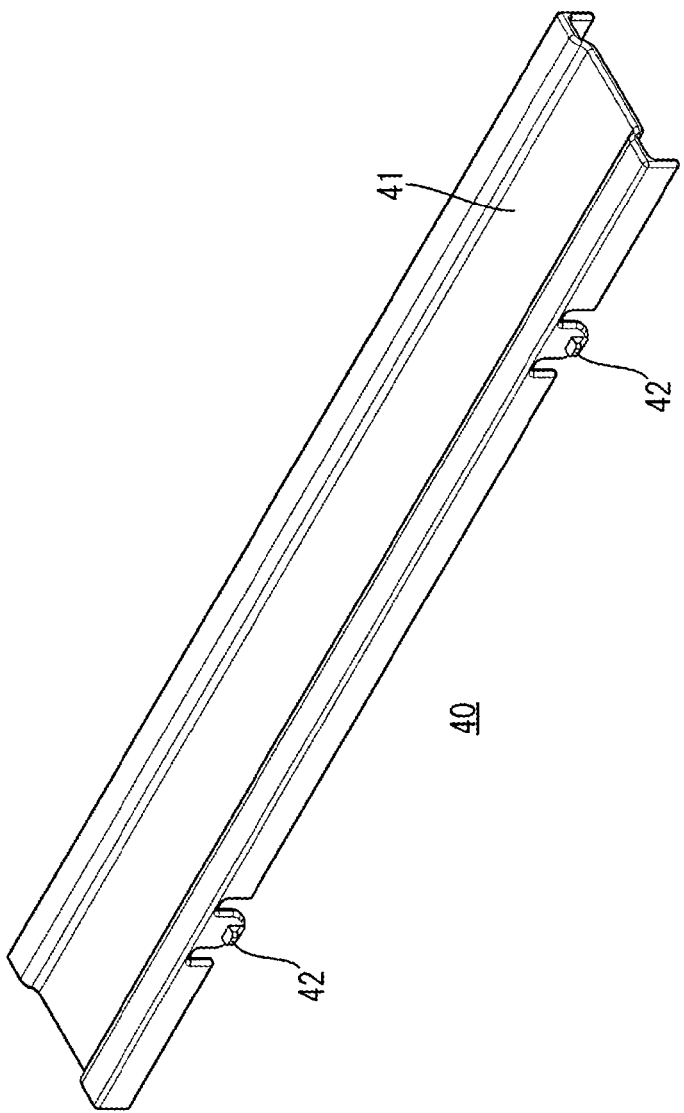
FIG. 8 is a perspective view showing the cover.

The cover 40 is made of a synthetic resin, and is coupled to the protector portion 30 to cover a surface 22A of the live portion. As shown in FIG. 8, the cover 40 has an abutment portion 41 that is to abut against the surface 22A of the live portion 22 of the busbar. As shown in FIG. 3, the abutment portion 41 includes the pressure contact surface 41A that is in direct contact with the surface 22A of the live portion 22 while being pressed against the surface 22A of the live portion 22 in a state in which the cover 40 is coupled to the protector portion 30.

Figure 2:
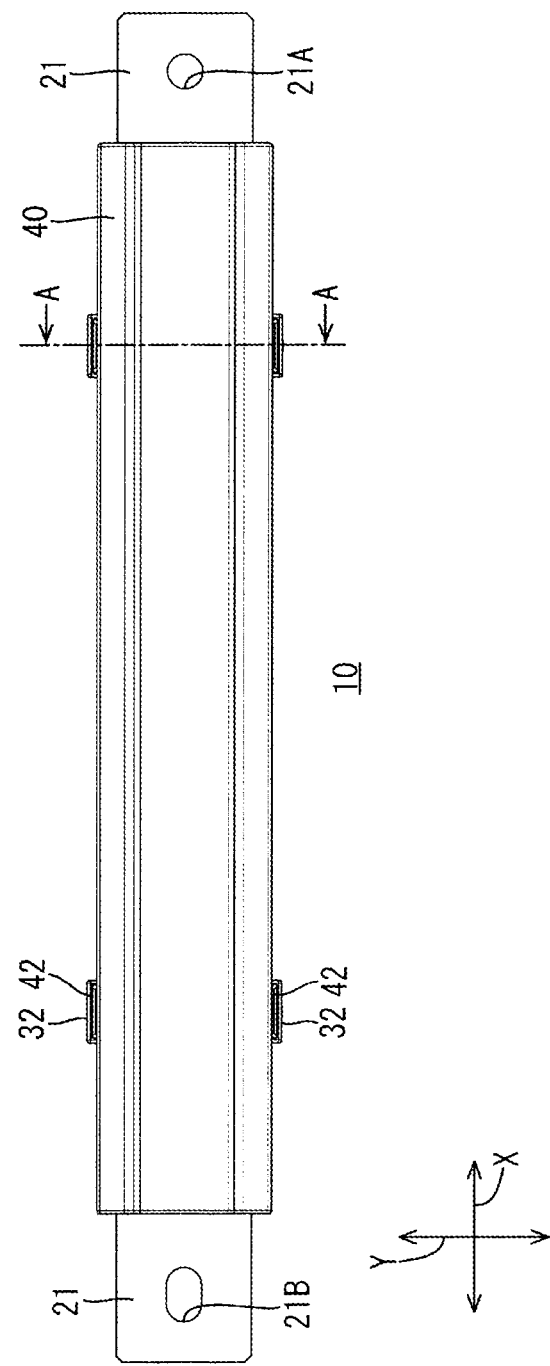
FIG. 2 is a plan view showing the electric connection member.

Moreover, the cover 40 has the lock portions (an example of a "coupling portion") 42 for coupling to the protector portion 30 at two locations in each of the two end portions of the cover 40 in the width direction (direction of arrow Y in FIG. 2). Note that the present invention is not limited to this configuration, and it is sufficient that the cover 40 has a lock portion 42 for coupling to the protector portion 30 in at least one end portion of the cover 40 in the width direction thereof. Also, as shown in FIG. 3, the cover 40 has a flexible portion 43 between the abutment portion 41 and each lock portion 42.

As shown in FIG. 3, the flexible portion 43 includes a curved portion 44 that increases a creepage distance K2 (indicated by a thick line in FIG. 3) between the pressure contact surface 41A and the lock receiving portion 32 in a state in which the lock portion 42 is coupled to the lock receiving portion 32 of the protector portion 30. Note that the present invention is not limited to this configuration, and the flexible portion 43 need not include the curved portion 44. Furthermore, the flexible portion 43 need not be provided.

Note that any synthetic resins that have insulating properties, such as polyolefins such as polyethylene and polypropylene, polyesters such as PBT and PET, and polyamides such as nylon 6, nylon 6,6, and nylon 4,6, can be used as the synthetic resins that compose the protector portion 30 and the cover 40.

The electric connection member 10 that is configured as described above is, for example, as shown in FIG. 9, applied to a battery pack 1 that is installed in a vehicle (not shown), such as an electric automobile or a hybrid car, and is used as a driving source of this vehicle. Here, the battery pack 1 is constituted by two battery modules (1A and 1B), each of which is constituted by a plurality of (twelve in FIG. 9) battery cells 2 each having a positive electrode terminal 3A and a negative electrode terminal 3B.

Figure 9:
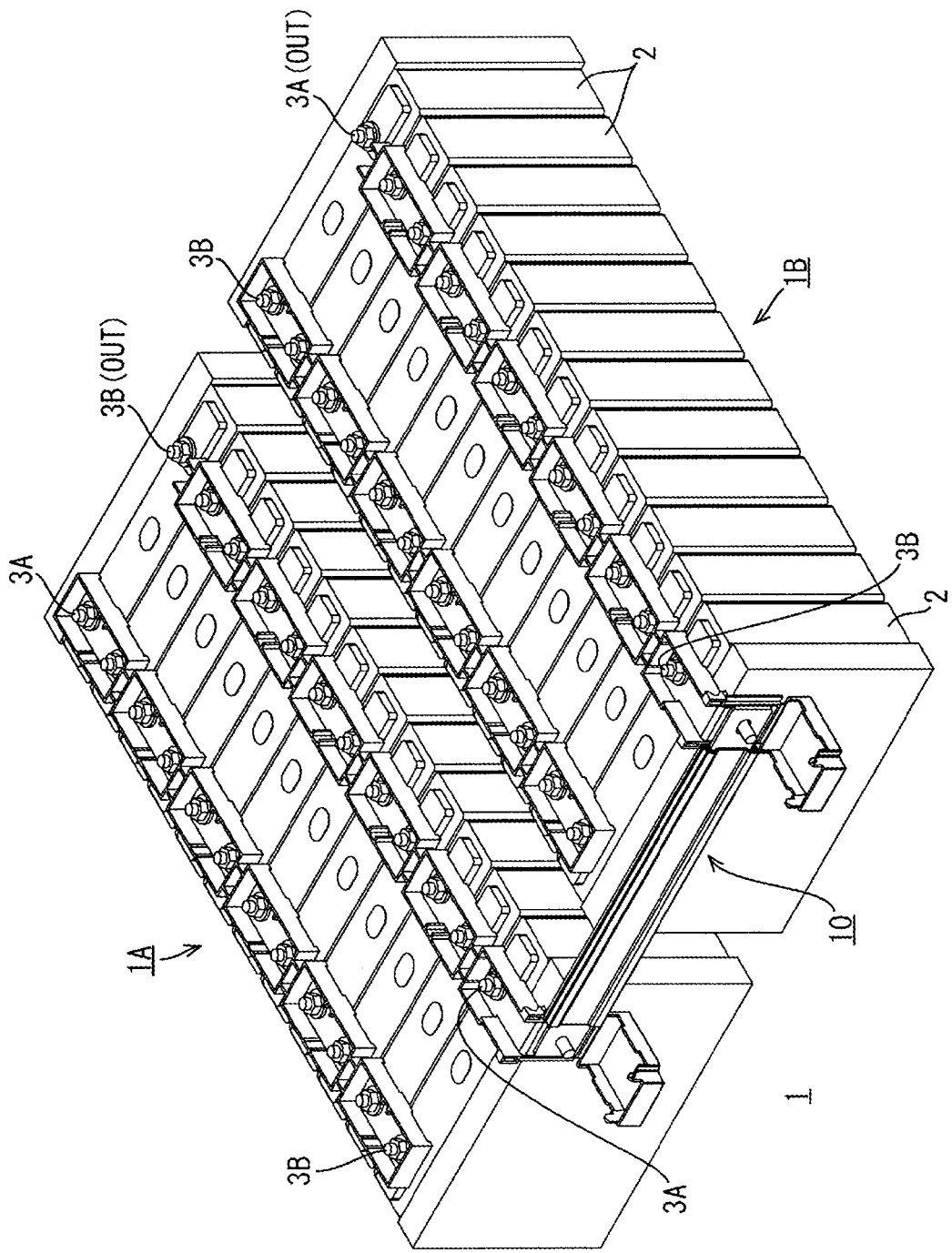
FIG. 9 is a perspective view showing an example of the use of the electric connection member.

Specifically, FIG. 9 shows an example in which the electric connection member 10 is used to connect two different battery modules (1A and 1B) in series. More specifically, FIG. 9 shows an example in which the electric connection member 10 is used to connect the positive electrode terminal 3A of the battery cell 2 located at an end portion of the battery module 1A to the negative electrode terminal 3B of the battery cell 2 located at an end portion of the battery module 1B.

Note that examples of the use of the electric connection member 10 are not limited to this example. For example, the electric connection member 10 may also be used to connect an external output negative electrode terminal 3B(OUT) of the battery module 1A to a terminal of an external device or to connect an external output positive electrode terminal 3A(OUT) of the battery module 1B to a terminal of an external device. Alternatively, the electric connection member 10 may be used for purposes other than the connection of terminals related to the battery pack 1.

The electric connection member 10 can be disposed in any position in a vehicle.

2. Effects of Embodiment 1

The abutment portion 41 of the cover 40 includes the pressure contact surface 41A, which is in direct contact with the surface 22A of the live portion of the busbar 20 while being pressed against the surface 22A of the live portion in a state in which the cover 40 is coupled to the protector portion 30. Therefore, the busbar 20 and the cover 40 are in close contact with each other, enabling the heat generated by the busbar 20 to be reliably transferred to the cover 40. Thus, heat dissipation of heat generated by the busbar 20 can be improved.

Also, when coupling the cover 40 to the protector portion 30, it is possible to automatically apply a pressure from the pressure contact surface 41A to the surface 22A of the live portion 22 of the busbar because of the dimensional conditions that the thickness T1 of the busbar 20 is larger than the separation distance K1. Therefore, the configuration in which the pressure contact surface 41A is in direct contact with the surface 22A of the live portion while being pressed against the surface 22A of the live portion can be achieved with a simple structure.

Also, during the coupling of the lock portions 42 of the cover 40 to the respective lock receiving portions 32 of the protector portion 30, the flexible portions 43 can change the relative positional relationship of the lock portions 42 with the lock receiving portions 32. That is to say, the flexible portions 43 deform and thereby facilitate the locking of the lock portions 42 to the lock receiving portions 32. Thus, the efficiency of the coupling operation can be improved.

Also, due to the increase in the creepage distance K2 by the curved portions 44, the electrical resistance between the busbar 20 and the lock receiving portions 32 of the protector portion 30 can be increased. Therefore, the safety of the electric connection member 10 in the case where condensation or the like occurs on the electric connection member 10 can be improved.

Embodiment 2

Next, Embodiment 2 will be described with reference to FIGS. 10 to 12. Note that only the difference from Embodiment 1 will be described below.

Figure 10:
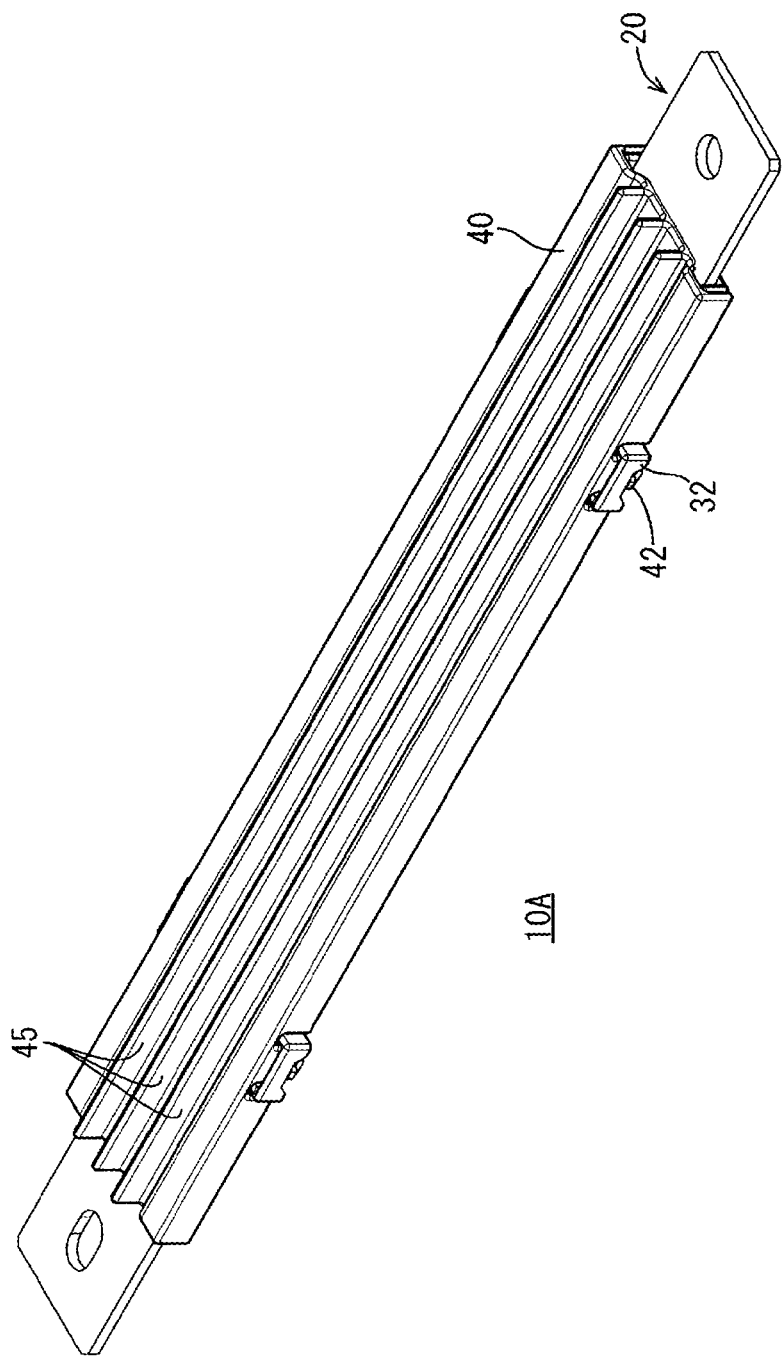
FIG. 10 is a perspective view showing an electric connection member according to Embodiment 2.
Figure 11:
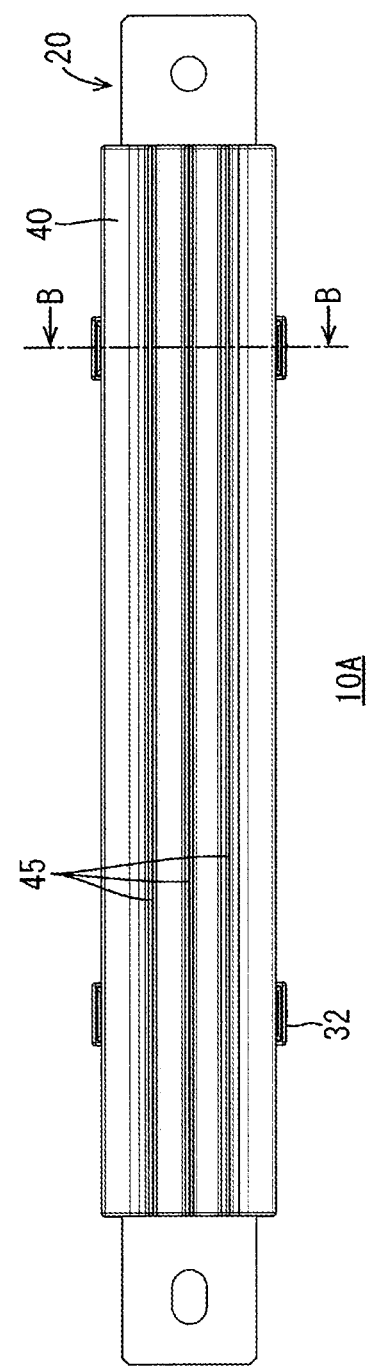
FIG. 11 is a plan view showing the electric connection member according to Embodiment 2.
Figure 12:
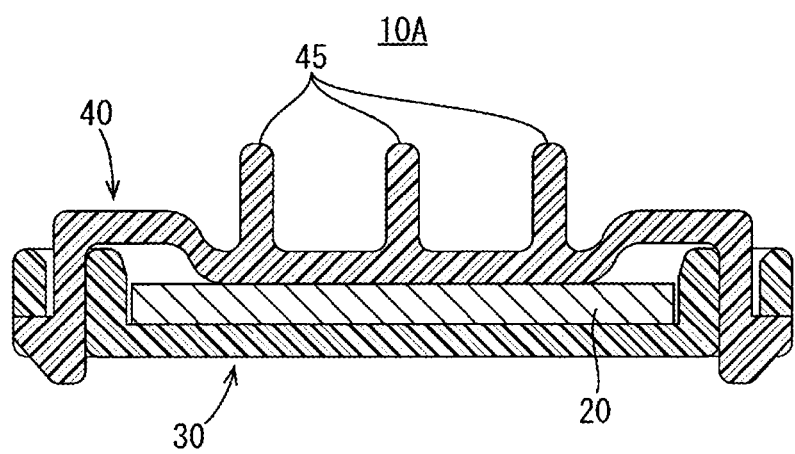
FIG. 12 is a cross-sectional view of the electric connection member when viewed from a direction indicated by arrows B in FIG. 11.

As shown in FIGS. 10 to 12, Embodiment 2 differs from Embodiment 1 only in that the cover 40 has heat dissipating fins 45. Heat dissipation from the cover 40 can be improved by providing the heat dissipating fins 45 in the cover 40 in this manner. Note that heat dissipating fins 45 may also be provided in the protector portion 30. That is to say, it is sufficient that heat dissipating fins 45 are provided in at least one of the protector portion 30 and the cover 40.

Embodiment 3

Next, Embodiment 3 will be described with reference to FIGS. 13 to 15. Note that only the difference from Embodiment 1 will be described below.

Figure 13:
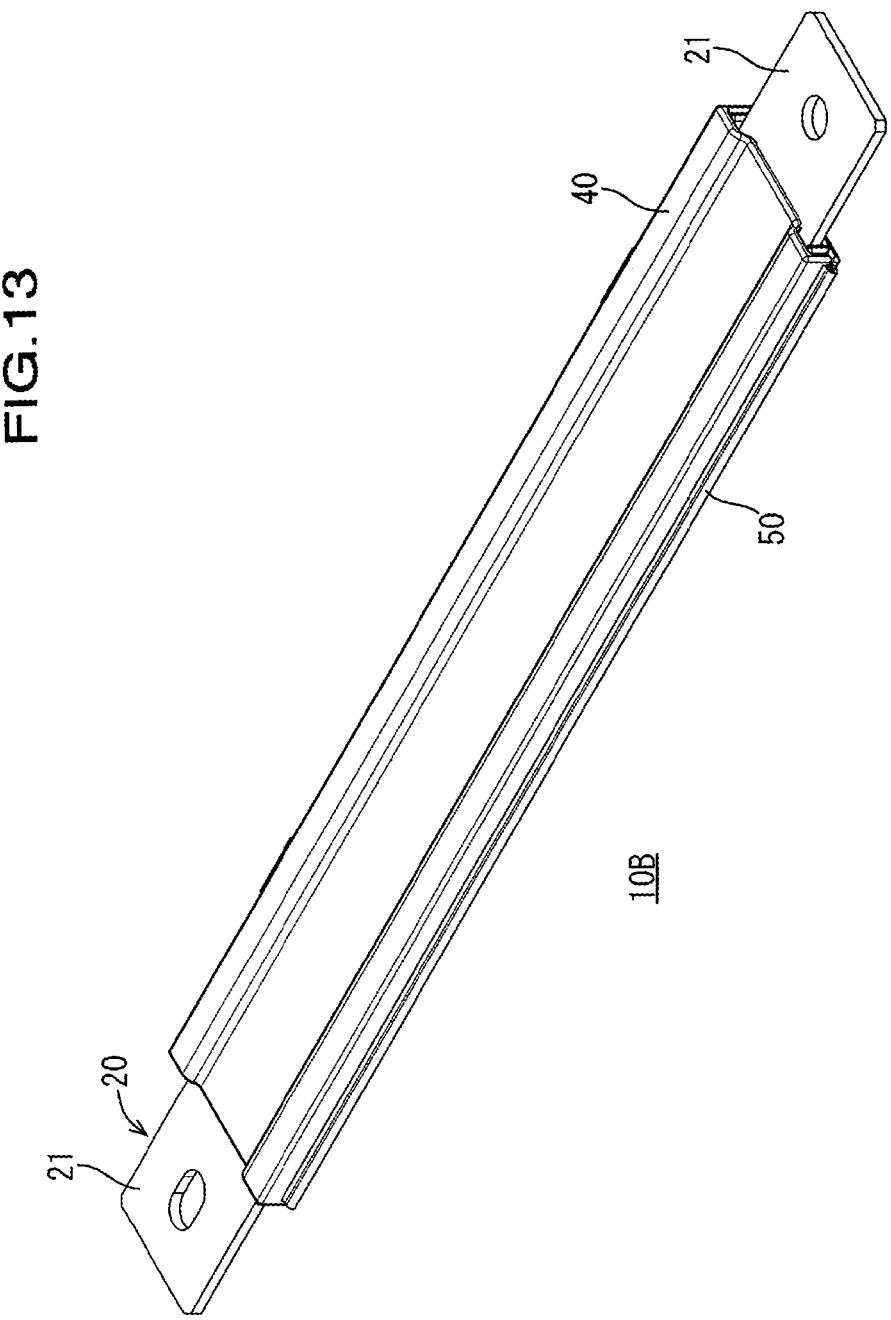
FIG. 13 is a perspective view showing an electric connection member according to Embodiment 3.
Figure 14:
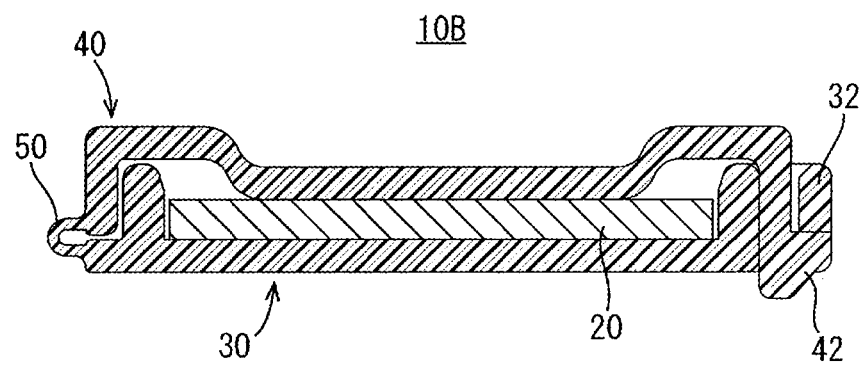
FIG. 14 is a cross-sectional view showing the electric connection member according to Embodiment 3.
Figure 15:
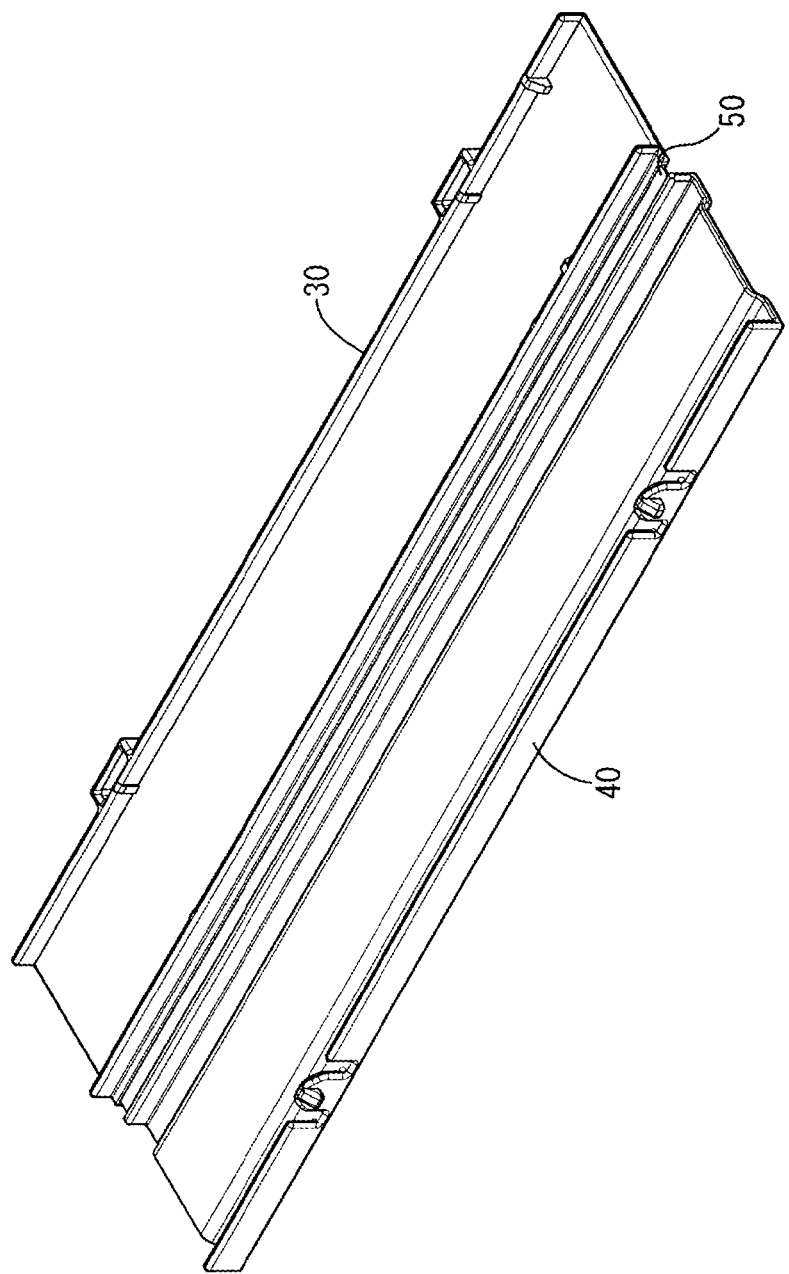
FIG. 15 is a perspective view showing a protector portion and a cover according to Embodiment 3.

As shown in FIGS. 13 to 15, Embodiment 3 differs from Embodiment 1 only in that the cover 40 and the protector portion 30 are united by a hinge portion 50. The operation for producing an electric connection member can be simplified by uniting the cover 40 and the protector portion 30 in this manner.

Other Embodiments

The present invention is not limited to the embodiments that have been described above using the drawings. For example, the following embodiments are also encompassed by the technical scope of the present invention.

(1) In the foregoing embodiments, it is also possible that a heat conductive sheet 60 is provided between the pressure contact surface 41A and the surface 22A of the live portion 22, and the pressure contact surface 41A therefore is in indirect contact with the surface 22A of the live portion while being pressed against the surface 22A of the live portion, via the heat conductive sheet 60.

Figure 16:
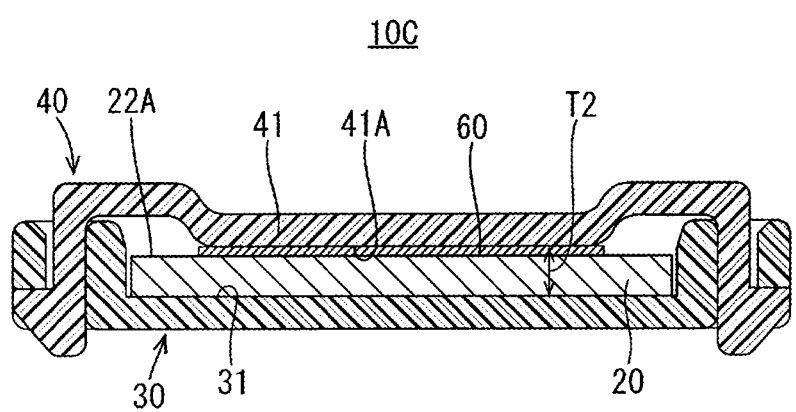
FIG. 16 is a cross-sectional view showing an electric connection member according to another embodiment.

FIG. 16 shows an example in which such a heat conductive sheet 60 is provided in Embodiment 1. In this case, the heat conductive sheet 60 can improve the efficiency of heat conduction from the busbar 20 to the cover 40.

Moreover, in the case where the heat conductive sheet 60 is provided, a configuration may also be adopted in which a sum value T2 (see FIG. 16) obtained by adding the thickness of the heat conductive sheet to the thickness T1 of the busbar is larger than the separation distance K1 (see FIG. 4) between the pressure contact surface 41A of the cover and the busbar mounting surface 31 of the protector portion in a state in which the cover is coupled to the protector portion without the busbar.

In this case, when coupling the cover to the protector portion, it is possible to automatically apply a pressure from the pressure contact surface 41A to the surface 22A of the live portion of the busbar because of the dimensional conditions. Therefore, in an embodiment in which the heat conductive sheet 60 is provided, the configuration in which the pressure contact surface 41A is in indirect contact with the surface 22A of the live portion while being pressed against the surface 22A of the live portion can be achieved with a simple structure.

Note that a heat conductive sheet 60 may also be provided between the protector portion 30 and the live portion 22 of the busbar.

(2) In the foregoing embodiments, it is possible that the protector portion and the cover are made of a synthetic resin material that has good heat conductivity.

In this case, heat conduction from the busbar to the protector portion and the cover can be improved. Therefore, heat dissipation from the busbar can be promoted.

(3) In the foregoing embodiments, it is also possible that the protector portion and the cover are made of a material that has good heat radiation properties, for example, a black material.

In this case, heat radiation from the protector portion and the cover to the outside can be improved. Therefore, heat dissipation from the busbar can be promoted.

LIST OF REFERENCE NUMERALS 10, 10A, 10B, 100: Electric connection member
20: Busbar
21: Terminal connecting portion
22: Live portion
22A: Surface of live portion
30: Protector portion
31: Busbar mounting surface
32: Lock receiving portion (Coupling receiving portion)
40: Cover
41: Abutment portion
41A: Pressure contact surface
42: Lock portion (Coupling portion)
43: Flexible portion
44: Curved portion (Flexible portion)
45: Heat dissipating fin
50: Hinge portion
60: Heat conductive sheet
K1: Separation distance between surface of live portion and pressure contact surface
K2: Creepage distance
T1: Thickness of busbar
T2: Sum value of thickness of busbar and thickness of heat conductive sheet

The invention claimed is:

1. A electric connection member for electrically connecting terminals to each other, the electric connection member comprising:
    a busbar including a plurality of terminal connecting portions and a live portion located between the terminal connecting portions;
    a protector portion that has a busbar mounting surface on which the live portion of the busbar is mounted, and insulates and protects the live portion; and
    a cover that is coupled to the protector portion and covers a surface of the live portion,
    wherein the cover has an abutment portion that abuts against the surface of the live portion,
    the abutment portion includes a pressure contact surface that is in direct or indirect contact with the surface of the live portion while being pressed against the surface of the live portion in a state in which the cover is coupled to the protector portion,
    the pressure contact surface is in direct contact with the surface of the live portion while being pressed against the surface of the live portion, and
    a thickness of the busbar is larger than a separation distance between the pressure contact surface of the cover and the busbar mounting surface of the protector portion in a state in which the cover is coupled to the protector portion without the busbar.

2. The electric connection member according to claim 1, wherein the cover has a coupling portion for coupling to the protector portion in at least one end portion of the cover in a width direction,
    the protector portion has a coupling receiving portion for receiving the coupling portion in at least one end portion of the protector portion in the width direction, and
    the cover has a flexible portion between the abutment portion and the coupling portion.

3. The electric connection member according to claim 2, wherein the flexible portion includes a curved portion that increases a creepage distance between the pressure contact surface and the coupling receiving portion in a state in which the coupling portion is coupled to the coupling receiving portion.

4. The electric connection member according to claim 1, wherein at least one of the protector portion and the cover has a heat dissipating fin.

5. The electric connection member according to claim 1, wherein a heat conductive sheet is provided between the protector portion and the live portion.

6. The electric connection member according to claim 1, wherein the cover and the protector portion are united by a hinge portion.

7. A electric connection member for electrically connecting terminals to each other, the electric connection member comprising:

a busbar including a plurality of terminal connecting portions and a live portion located between the terminal connecting portions;

a protector portion that has a busbar mounting surface on which the live portion of the busbar is mounted, and insulates and protects the live portion; and a cover that is coupled to the protector portion and covers a surface of the live portion, wherein the cover has an abutment portion that abuts against the surface of the live portion, the abutment portion includes a pressure contact surface that is in direct or indirect contact with the surface of the live portion while being pressed against the surface of the live portion in a state in which the cover is coupled to the protector portion, a heat conductive sheet is provided between the pressure contact surface and the surface of the live portion, and the pressure contact surface is in indirect contact with the surface of the live portion while being pressed against the surface of the live portion, via the heat conductive sheet, wherein a sum of a thickness of the heat conductive sheet and a thickness of the busbar is larger than a separation distance between the pressure contact surface of the cover and the busbar mounting surface of the protector portion in a state in which the cover is coupled to the protector portion without the busbar.

8. The electric connection member according to claim 7, wherein the cover has a coupling portion for coupling to the protector portion in at least one end portion of the cover in a width direction, the protector portion has a coupling receiving portion for receiving the coupling portion in at least one end portion of the protector portion in the width direction, and the cover has a flexible portion between the abutment portion and the coupling portion.

9. The electric connection member according to claim 8, wherein the flexible portion includes a curved portion that increases a creepage distance between the pressure contact surface and the coupling receiving portion in a state in which the coupling portion is coupled to the coupling receiving portion.

10. The electric connection member according to claim 7, wherein at least one of the protector portion and the cover has a heat dissipating fin.

11. The electric connection member according to claim 7, wherein a heat conductive sheet is provided between the protector portion and the live portion.

12. The electric connection member according to claim 7, wherein the cover and the protector portion are united by a hinge portion.

* * * * *